(12) United States Patent
Pridgen

(10) Patent No.: US 6,190,175 B1
(45) Date of Patent: Feb. 20, 2001

(54) VOCABULARY TEACHING DEVICE

(76) Inventor: James H. Pridgen, 2107 Oleander Dr., Wilmington, NC (US) 28403

( * ) Notice: Under 35 U.S.C. 154(b), the term of this patent shall be extended for 0 days.

(21) Appl. No.: 09/370,118

(22) Filed: Aug. 6, 1999

(51) Int. Cl.⁷ .................................................. G09B 5/00
(52) U.S. Cl. ............................................ 434/169; 434/156
(58) Field of Search ................................ 434/169, 156, 434/167, 185; 248/205.2; 369/1, 12; 2/160

(56) References Cited

U.S. PATENT DOCUMENTS

| | | |
|---|---|---|
| 4,237,624 | 12/1980 | Yeh . |
| 4,411,628 * | 10/1983 | Laughon .............................. 434/169 |
| 4,610,054 * | 9/1986 | Malian ............................... 248/205.2 |
| 4,864,658 * | 9/1989 | Russell et al. ........................... 2/160 |
| 5,349,575 * | 9/1994 | Park .......................................... 369/1 |
| 5,404,444 * | 4/1995 | Billings ................................. 434/169 |
| 5,433,610 * | 7/1995 | Godfrey et al. ...................... 434/169 |
| 5,453,013 * | 9/1995 | Billings et al. ....................... 434/169 |
| 5,478,240 | 12/1995 | Cogliano . |
| 5,511,980 | 4/1996 | Wood . |
| 5,533,902 | 7/1996 | Miller . |
| 5,851,119 * | 12/1998 | Sharpe, III et al. ................. 434/169 |
| 5,897,324 * | 4/1999 | Tan ....................................... 434/169 |
| 5,906,492 | 5/1999 | Putterman . |

* cited by examiner

*Primary Examiner*—Sam Rimell
(74) *Attorney, Agent, or Firm*—Rhodes & Mason, PLLC

(57) ABSTRACT

A device and method for teaching children the names of household objects in which a device that includes a recording of the name of the object and a switch to activate play of the recording is attached to an object corresponding to the recorded name in a location where the device is reachable by the child, so that the name of the object will be stated when the child closes the switch, thereby aiding the child in associating the stated name with the object to which the device is attached. The device may include an electronic circuit with a recordable IC in circuit with a speaker, a power source and a switch; and a housing enclosing the circuit. The housing can have a front surface with means to close the switch, and a back surface having an attachment means for securing the housing to the object.

14 Claims, 3 Drawing Sheets

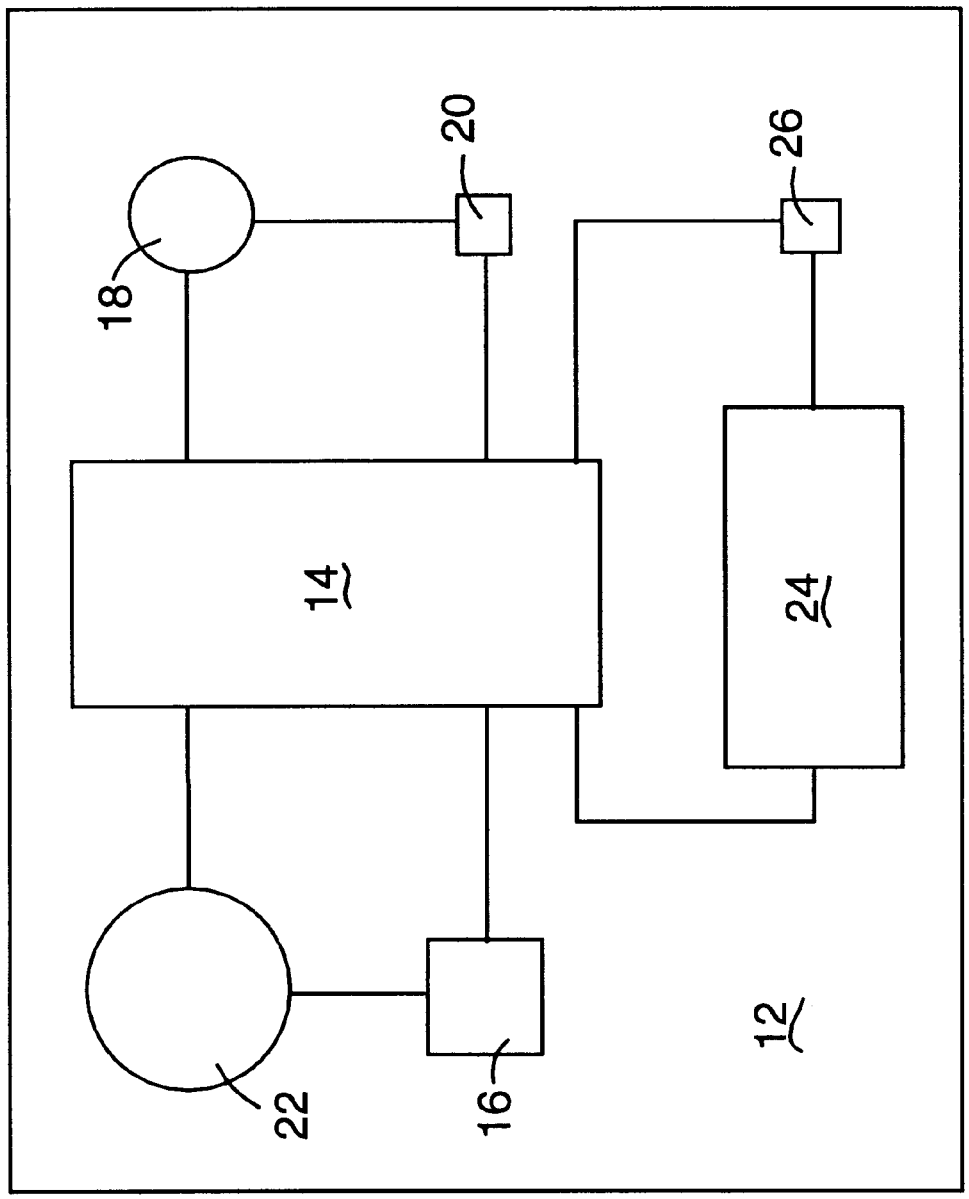

VOCABULARY TEACHING DEVICE

BACKGROUND OF THE INVENTION (1) Field of the Invention

The present invention relates generally to devices for use in teaching children the names of objects, and in particular to devices containing a prerecorded object name that can be attached to an object corresponding to the name, with the name being played when the device is touched.

(2) Description of the Prior Art

Various devices are described in the prior art for use in teaching language to toddlers and other small children. These devices often include recorded messages that are played when the child performs some act that may be associated with the nature of the message. The child then learns the pronunciation and meaning of the word through repeated playing of the message.

For example, U.S. Pat. No. 5,433,610 to Godfrey et al., entitled "Educational Device For Children," describes a holder in which a plurality of photographs, positioned above buttons that are in a circuit with a recordable integrated circuit or IC.

The device also includes components and circuitry for recording a plurality of messages on the IC, with the messages corresponding to the buttons. When the child presses one of the photographs, the button beneath the photograph is depressed, completing the circuit, and causing the IC to play the message corresponding to the particular button.

Thus, the parent can place photographs of various individuals and objects over each of the buttons and record a message on the IC for each button with the messages corresponding to the photographic images. The child, upon pushing one of the buttons, hears the corresponding message and learns, through repetition, to associate the sound with the object in the photograph.

The following patents are representative of other prior art devices designed for vocabulary teaching:

| U.S. Pat. No. | Inventor(s) |
| --- | --- |
| 4,237,624 | Yeh |
| 5,906,492 | Putterman |
| 5,533,902 | Miller |
| 5,511,980 | Wood |
| 5,478,240 | Cogliano |

The effectiveness of devices for teaching vocabulary to toddlers and other small children depends upon the ease with which the displayed object and the word can be associated, and upon the interest of the child in repeating the given activity a sufficient number of times to form an association between the object and the word. If the child finds difficulty in associating the object with the word, then numerous repetitions may be required for the connection to by made, if the connection is made at all. Also, the activity must be of sufficient interest for the child to repeat the act several times.

A device that would enable the child to readily associate an object with a spoken word, and hold the child's attention during multiple repetitions of the act would be of great value in improving the child's language skills.

SUMMARY OF THE INVENTION

The present invention is directed to a device for teaching language to children, especially the names of common household objects, and in particular to a device that is attachable to one of several household objects, such as a television, sofa, refrigerator, etc., within reach of the child and activated by a toddler to pronounce the name of the object to which the device is attached.

The device is specifically designed to address the natural energy and inquisitive nature of toddlers who enjoy moving about the house to explore various objects, and is basically comprised of a speaker circuit that includes a recordable IC of the type often referred to as a voice chip, a battery, a speaker and an activation switch that is closed by contact. The term "recordable IC" as used herein is intended to include ICs or integrated circuits that are recorded by the manufacturer or supplier, as well as ICs that are designed for recording by the end user.

This circuitry, which can be quite compact when using modern electronic components, is enclosed within a housing having a front surface and a back surface. The housing may be in the shape of a rectangular, relatively thin housing, shaped somewhat like a playing card. Generally, the dimensions should be such that the device can be readily positioned on the object and easily stored when not used. At the same time, the dimensions should be such that the device can be easily manipulated by the child. Preferably, the device is within a rectangular housing that is from about 2 to 4 inches in width, about 2 to 4 inches in height, and about ⅛ to ½ inch in thickness. The button or plate on the front of the housing should be large enough to be easily manipulated by the child. Preferably the button or plate is at least ¼ and even more preferably, at least ⅓ of the surface area of the front of the housing.

The front surface of the housing includes a plate or button that is in communication with the activation switch, so that the switch is closed when the button is contacted. The plate or button can be separate from the activation switch or an integral part of the switch. The activation switch can be a pressure switch, which requires actual movement of the plate when contacted to activate the switch. Alternatively, the switch can be a capacitance switch which required only touching of the plate or button for activation. The back surface includes a means for attaching the housing to a selected object, e.g., a magnet, adhesive, gripping pad, or strap.

When used, the name of a given object is recorded onto the IC of the device, and the device is attached to the given object within reach of the child, with the back surface of the device against the object. The child, while exploring, will note the device and, when pressing on the device's front surface, will hear the name of the object to which the device is attached. The devices will be attached to several objects around the house, so that the child, as he or she continues to explore, will discover additional devices, and quickly learn how to active them to hear the name of the attached object.

Thus, the device of the present invention provides at least two advantages over prior art teaching devices. First, the device is directly attached to the object to be identified. As a result, the child is not challenged to first form an association between a picture of the object and the actual object, but immediately associates the word with the actual object. Since association of a picture with an object can be at least as challenging to a young child as associating a word with an object, this obstacle is eliminated by the present invention.

The invention also accommodates the need for the child to continually be in motion, instead of sitting in one place. Young children quickly become bored when being asked to sit in one place and perform a repetitive act, such as pushing a picture in a holder. As a result, the child looses interest in the "game" and often does not repeat the act a sufficient number of times to form an association between the word and the object. With the present device, however, the child is able to move to various locations, returning to activate the device several times Various refinements and modifications of the device are contemplated. For example, the device can be comprised of an IC that is prerecorded with a particular word, or a recordable IC which can be used by the parent to record a word or a comment including the word. Two ICs may be included in the same circuit, or one IC can be designed with a prerecorded message and space for a recordable message. The prerecorded message can be in a foreign language, so that the child has the opportunity to learn the name of the object in more than one language.

The surface of the housing can be in a bright color or decorated with a design that will visually attract the child. The circuit can also include a light that is illuminated, or a sound, such as musical tones, in addition to the object name, that is activated when the circuit is completed. The housing can be designed with a replaceable back segment, so that different back surfaces can be used to attach the device to different objects. For example, the back segment can be a removable magnetic plate that can be replaced with an adhesive plate.

Accordingly, one aspect of the present invention is to provide a vocabulary teaching device for use in teaching the names of objects to children comprising an electronic circuit including a recordable IC in circuit with a speaker, a power source and a switch; and a housing enclosing the circuit, the housing having a front surface, with the pressure switch being accessible through the front surface, and a back surface having an attachment means for securing the housing to an object.

Another aspect of the present invention is to provide a method of teaching the name of an object to a child comprising providing a device including a recording of the name of the object, and a switch to activate play of the recording; and attaching the device to the object in a position reachable by the child, whereby the name of the object will be stated when the child closes the switch, aiding the child in associating the stated name with the object to which the device is attached.

These and other aspects of the present invention will become apparent to those skilled in the art after a reading of the following description of the preferred embodiment.

BRIEF DESCRIPTION OF THE DRAWINGS

FIG. 3 is schematic diagram of the components used in the device of FIG. 1.

DETAILED DESCRIPTION OF THE INVENTION

Figure 2:
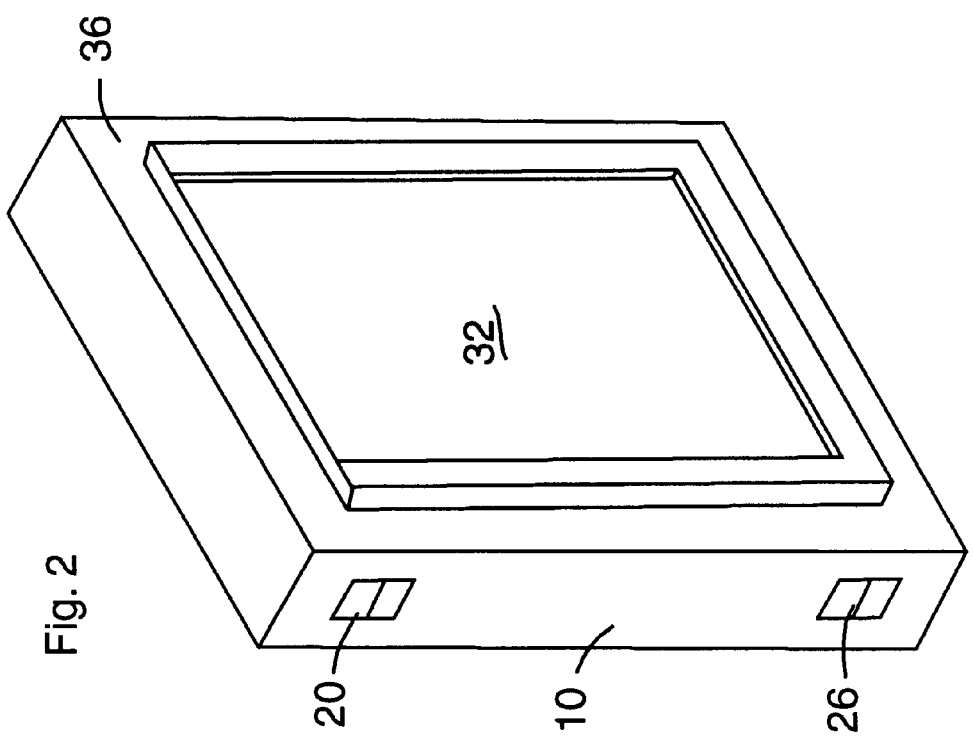
FIG. 2 is a perspective view of the back of the device of FIG. 1.
Figure 1:
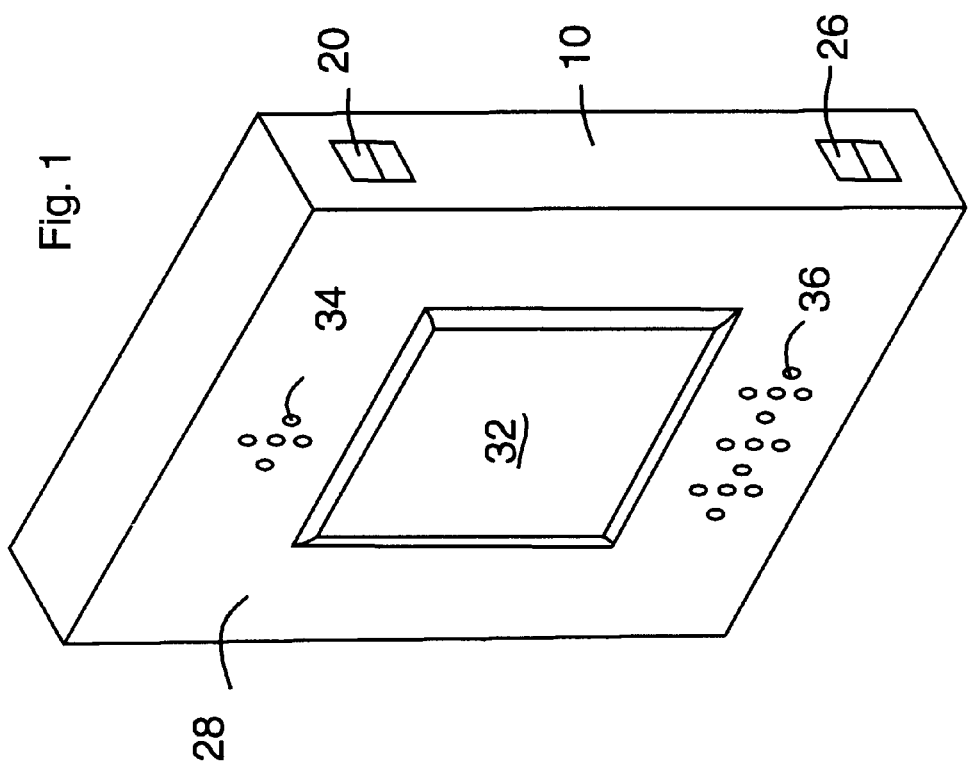
FIG. 1 is a perspective view of the front of the vocabulary building device of the present invention.

In the following description, terms such as horizontal, upright, vertical, above, below, beneath, and the like, are used solely for the purpose of clarity in illustrating the invention, and should not be taken as words of limitation.

The drawings are for the purpose of illustrating the invention and are not intended to be to scale.

The teaching device illustrated in the preferred embodiment is comprised of a rectangular support housing 10, that encloses a circuit board, generally 12, supporting the control circuit schematically illustrated in greater detail in FIG. 3. As best illustrated in FIG. 3, circuit board 12 includes a recordable IC 14 connected through a pressure switch 16 to a microphone 18, a recording switch 20, a speaker 22, a power source 24 and an on-off switch 26.

Housing 10 includes a front surface 28, and a back surface 30. A detachable mounting plate 32, which can be of various configurations, is removably attached to back surface 30. A pressure switch cover 32 is located on front surface 28 in a position to close pressure switch 16 when pressed. Openings 34 are located in front of microphone 18, and openings 36 are located in front of speaker 22.

When used, switch 26 is moved to the "on" position. Recording, switch 20 is then pressed by the parent, who speaks the name of a given object, or a comment including the name, into microphone 18, recording the word or comment onto IC 14. The device is then attached to the surface of an object corresponding to the recorded name at a level within reach of the child to be educated.

The child is then directed to the device, or allowed to discover it on his or her own. When the device is discovered, the natural curiosity of the child will motivate the child to touch the device, particularly if the device is decorated and/or in a bright color. When touching the device, the child will depress plate 32, which in turn will close pressure switch 16 to complete the circuit, and cause recordable IC 14 to play the recorded name. Depressing of switch plate 32 can also activate a light or an additional sound. Through repetition, the child will learn to associate the spoken name with the object to which the device is attached.

Figure 4:
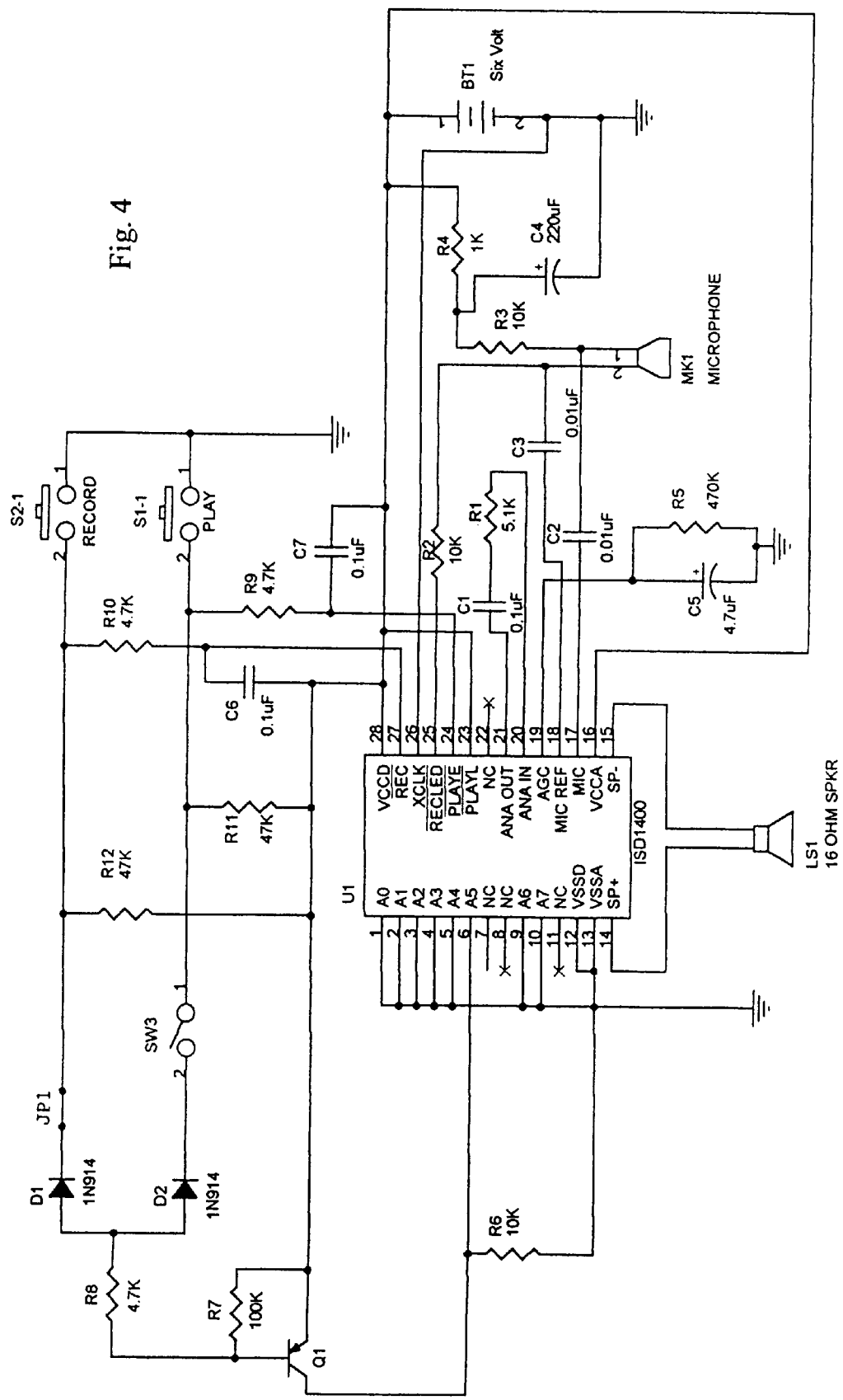
FIG. 4 is a circuit diagram that is suitable for the present invention.

FIG. 4 illustrates one of several circuit diagrams that can be used in the practice of the invention. As in the schematic illustration of FIG. 3, the circuit is comprised of an integrated circuit or IC operatively connected to a microphone, a speaker, and a six volt battery. The IC illustrated is a record and playback ISD 1400 series IC manufactured by Information Storage Devices, Inc., of San Jose, Calif.

This IC is suitable for recording messages of 16 seconds or 20 seconds. The message can also be split into a prerecorded segment, and a recorded segment. The two segments can be played together, or only the latter segment played, depending on whether or not switch SW3 is open or closed. If switch SW3 is closed, and no message is recorded on the recordable segment, only the prerecorded segment will be played.

Thus, a prerecorded segment may include the name of the object, whether in English or another language, a phrase, or sounds. The recordable segment may include the name of the object, which can be stated alone when the switch is closed, or in combination with a compatible message portion on the prerecorded segment.

In order to provide the child with several vocabulary building experiences, a plurality of devices will normally be provided, with a different object name being recorded on each device. The plurality of devices will then be placed upon several household objects corresponding to the recorded names. The child, as he or she wanders about the house, can discover and press several devices, thus continuing to hear word repetitions on several objects to increase his or her vocabulary.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. The combination of a household object and a vocabulary teaching device for use in teaching the name of said household object to children, said household object being selected from the group consisting of a television, a sofa and a refrigerator, said vocabulary teaching device comprising:

a) an electronic circuit including an IC in circuit with a speaker, a power source and an activation switch, said IC being recorded with the name of said household object; and b) a housing enclosing said circuit, said housing having a front surface, said activation switch being accessible through said front surface, a back surface having an attachment means adapted to secure said housing to said household object, said recorded name of said household object being played when said activation switch is activated.

2. The device of claim 1, wherein said circuit further includes a microphone and a recording switch for use in recording a name or comment onto said IC.

3. The device of claim 1, wherein said front surface includes a cover plate over said switch, said switch being closed when said cover plate is pressed.

4. The device of claim 1, wherein said circuit further includes an on-off switch.

5. The device of claim 1, wherein said housing is rectangular.

6. The device of claim 1, wherein said housing further includes a removable attachment plate.

7. The device of claim 1, wherein said housing includes a magnetic back surface for securing said device to said object.

8. The device of claim 1, wherein said housing includes a strap for securing said housing to said object.

9. The device of claim 1, wherein two separately accessible message segments can be recorded on said IC.

10. A method of teaching the name of a given object to a child comprising:

a) providing a device including a housing having a front surface and a back surface, a voice IC recorded with the name of said given object within said housing, an activation switch to activate play of said recording accessible from the front surface of said housing, and an attachment means on the back surface of said housing; and b) attaching the back of said device to said given object in a position reachable by said child, whereby the name of said object will be stated when the child closes said activation switch, aiding the child in associating the name of said given object with the given object to which the device is attached.

11. The method of claim 10, wherein said device includes an electronic circuit with a voice IC in circuit with a speaker, a power source and said activation switch; and a housing enclosing said circuit, said housing having a front surface, said activation switch being accessible through said front surface, a back surface having an attachment means for securing said housing to said given object.

12. The method of claim 10, wherein said device further includes a strap and said device is attached to said given object with said strap.

13. The method of claim 10, wherein said device includes a magnet and said device is attached to said given object with said magnet.

14. The method of claim 10, wherein said device includes an adhesive backing and said device is attached to said given object with said adhesive backing.

* * * * *